United States Patent
Durbin et al.

(10) Patent No.: US 10,865,862 B2
(45) Date of Patent: Dec. 15, 2020

(54) PULLEY AND BALL NUT ASSEMBLY

(71) Applicant: Hitachi Automotive Systems Americas, Inc., Harrodsburg, KY (US)

(72) Inventors: Charles Durbin, Dexter, MI (US); Satoru Muto, West Bloomfield, MI (US); Bikal Adhikari, Wixom, MI (US); Ryo Tashiro, Yokohama (JP)

(73) Assignee: HITACHI AUTOMOTIVE SYSTEMS AMERICAS, INC., Harrodsburg, KY (US)

( * ) Notice: Subject to any disclaimer, the term of this patent is extended or adjusted under 35 U.S.C. 154(b) by 145 days.

(21) Appl. No.: 16/112,917

(22) Filed: Aug. 27, 2018

(65) Prior Publication Data

US 2020/0063839 A1  Feb. 27, 2020

(51) Int. Cl.
   *F16H 25/22* (2006.01)
   *F16C 19/16* (2006.01)
   *F16H 57/00* (2012.01)
   *F16H 25/20* (2006.01)

(52) U.S. Cl.
   CPC ......... *F16H 25/2214* (2013.01); *F16C 19/16* (2013.01); *F16H 57/0025* (2013.01); *F16H 2025/2096* (2013.01)

(58) Field of Classification Search
   CPC ............. F16H 25/2214; F16H 57/0025; F16H 2025/2096; F16H 25/2204; F16H 25/2219; F16C 19/16; F16C 19/02
   See application file for complete search history.

(56) References Cited

U.S. PATENT DOCUMENTS

| | | | |
|---|---|---|---|
| 2009/0288511 A1* | 11/2009 | Kuribayashi | F16H 25/20 74/89.38 |
| 2014/0090921 A1* | 4/2014 | Shavrnoch | B62D 5/0448 180/444 |
| 2015/0329138 A1* | 11/2015 | Peterreins | B62D 5/0448 74/424.75 |
| 2017/0030448 A1* | 2/2017 | Urban | B62D 5/0424 |
| 2017/0158221 A1* | 6/2017 | Yamamoto | F16H 25/20 |
| 2017/0225705 A1* | 8/2017 | Tomikawa | B62D 5/0424 |
| 2017/0349205 A1* | 12/2017 | Kaneko | F16H 25/22 |
| 2018/0281843 A1* | 10/2018 | Asakura | F16H 25/24 |
| 2018/0306286 A1* | 10/2018 | Illes | B62D 5/0448 |
| 2018/0346015 A1* | 12/2018 | Tomikawa | B62D 5/0448 |
| 2018/0354548 A1* | 12/2018 | Eickholt | B62D 3/12 |
| 2019/0077445 A1* | 3/2019 | Yoshida | B62D 5/0448 |
| 2019/0168799 A1* | 6/2019 | Ogata | B62D 5/0424 |

(Continued)

*Primary Examiner* — Zakaria Elahmadi
(74) *Attorney, Agent, or Firm* — Mattingly & Malur, PC

(57) ABSTRACT

In some examples, a ball nut includes a first end and an outer cylindrical surface having a first diameter. A pulley may be mounted on the first end of the ball nut. The pulley may include an inner cylindrical surface having a second diameter larger than the first diameter of the ball nut and sized to engage with the outer cylindrical surface in a press fit. Furthermore, a circumferential groove may be formed in a portion of the first end of the ball nut extending beyond the pulley when the pulley is mounted on the first end of the ball nut. A retaining ring is disposed in the circumferential groove to prevent removal of the pulley from the first end of the ball nut. Furthermore, a portion of the ball nut may engage with a portion the pulley to prevent relative rotation between the pulley and the ball nut.

20 Claims, 5 Drawing Sheets

(56) References Cited

U.S. PATENT DOCUMENTS

| | | | |
|---|---|---|---|
| 2019/0242466 A1* | 8/2019 | Brieschke | F16H 25/2021 |
| 2019/0277712 A1* | 9/2019 | Paine | B25J 9/12 |
| 2019/0351938 A1* | 11/2019 | Tashiro | F16H 25/22 |
| 2019/0360569 A1* | 11/2019 | Yorozu | F16H 25/2219 |
| 2019/0382047 A1* | 12/2019 | Yoshida | B62D 5/0448 |
| 2019/0383370 A1* | 12/2019 | Engel | F16H 25/2223 |

\* cited by examiner

PULLEY AND BALL NUT ASSEMBLY

BACKGROUND

A ball screw is a mechanical linear actuator that translates rotational motion to linear motion. A grooved shaft, referred to as a screw, provides one-half of a helical bearing race for a plurality of ball bearings contained within a ball nut that is mounted on the screw. The ball nut may include an internal helical groove that is complementary to the helical groove on the screw and which serve as the other half of the helical bearing race for the ball bearings. As either the ball nut or the screw is rotated, lateral motion between the ball nut and the screw is achieved. The ball bearings are typically recirculated inside the ball nut as the rotation takes place.

Mounting a pulley to a ball nut can be challenging because the pulley should be mounted within a close tolerance to the center of rotation of the ball nut to avoid unexpected forces on the ball bearings, the ball nut and/or the screw, which may cause uneven wear, binding, or the like. Furthermore, the use of fasteners, such as bolts or machine screws for mounting a pulley to a ball nut may involve a complicated installation procedure of first centering the pulley before tightening the bolts or screws to ensure that the pulley is properly centered with the ball nut when the bolts or screws are tightened. Additionally, bolts and machine screws include the inherent risk of coming loose at inopportune times.

SUMMARY

Some implementations include arrangements and techniques for a pulley and ball nut assembly. In some examples, the ball nut includes a first end and an outer cylindrical surface having a first diameter. A pulley may be mounted on the first end of the ball nut. The pulley may include an inner cylindrical surface having a second diameter larger than the first diameter of the ball nut, and sized to engage with the outer cylindrical surface in a press fit. Furthermore, a circumferential groove may be formed in a portion of the first end of the ball nut extending beyond the pulley when the pulley is mounted on the first end of the ball nut. A retaining ring may be disposed in the circumferential groove to prevent removal of the pulley from the first end of the ball nut. Furthermore, a portion of the ball nut may engage with a portion the pulley to prevent relative rotation between the pulley and the ball nut.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The technology herein includes novel arrangements and techniques for a self-centering pulley that is press fitted to a ball nut and secured in place with a retaining ring. For example, an inner cylindrical surface of the pulley and an outer cylindrical surface of the ball nut may be configured to engage with each other using a press fit (also referred to as an interference fit). The use of a press fit along with a selected manufacturing tolerance for the center of rotation of the pulley and the center of rotation of the ball nut outer cylindrical surface, results in the pulley self-centering on the ball nut when press fitted onto the ball nut.

The ball nut may include a pulley-receiving first end that may be formed with a circumferential retaining ring groove and a circumferential shoulder. When the pulley is mounted onto the first end of the ball nut, the circumferential groove is exposed. Accordingly, a retaining ring may be mounted inside the circumferential groove for retaining the pulley on the ball nut. The retaining ring prevents removal of the pulley in the lateral (axial) direction. In addition, a circular inner wall on the pulley abuts against the circumferential shoulder on the ball nut to limit how far the pulley may advance onto the ball nut during press fitting of the pulley onto the ball nut.

The pulley and the ball nut may further interlock using one or more tabs and one or more complementary slots. For example, the one or more tabs may prevent relative rotation between the pulley and the ball nut when the pulley is press fitted onto the ball nut. As one example, the pulley may include at least one tab extending inward from the inner cylindrical surface of the pulley. The tab may engage in a matching slot formed in the outer cylindrical surface of the ball nut to prevent relative rotation between the pulley and the ball nut.

For discussion purposes, some example implementations are described in the environment of a ball screw with a ball nut and pulley assembly, such as for use with a vehicle steering system or the like. However, implementations herein are not limited to the particular examples provided, and may be extended to other service environments, other uses for the ball screw with the ball nut and pulley assembly, or for other types of pulleys, or the like, as will be apparent to those of skill in the art in light of the disclosure herein. For example, the pulley herein may be a gear, a cog, a sprocket, or the like. Accordingly, the term pulley should be broadly interpreted to include smooth pulleys, toothed pulleys, grooved pulleys, gears, cogs, sprockets, and so forth. The design disclosed herein reduces assembly time as compared to conventional techniques and also reduces manufacturing costs.

Figure 1:
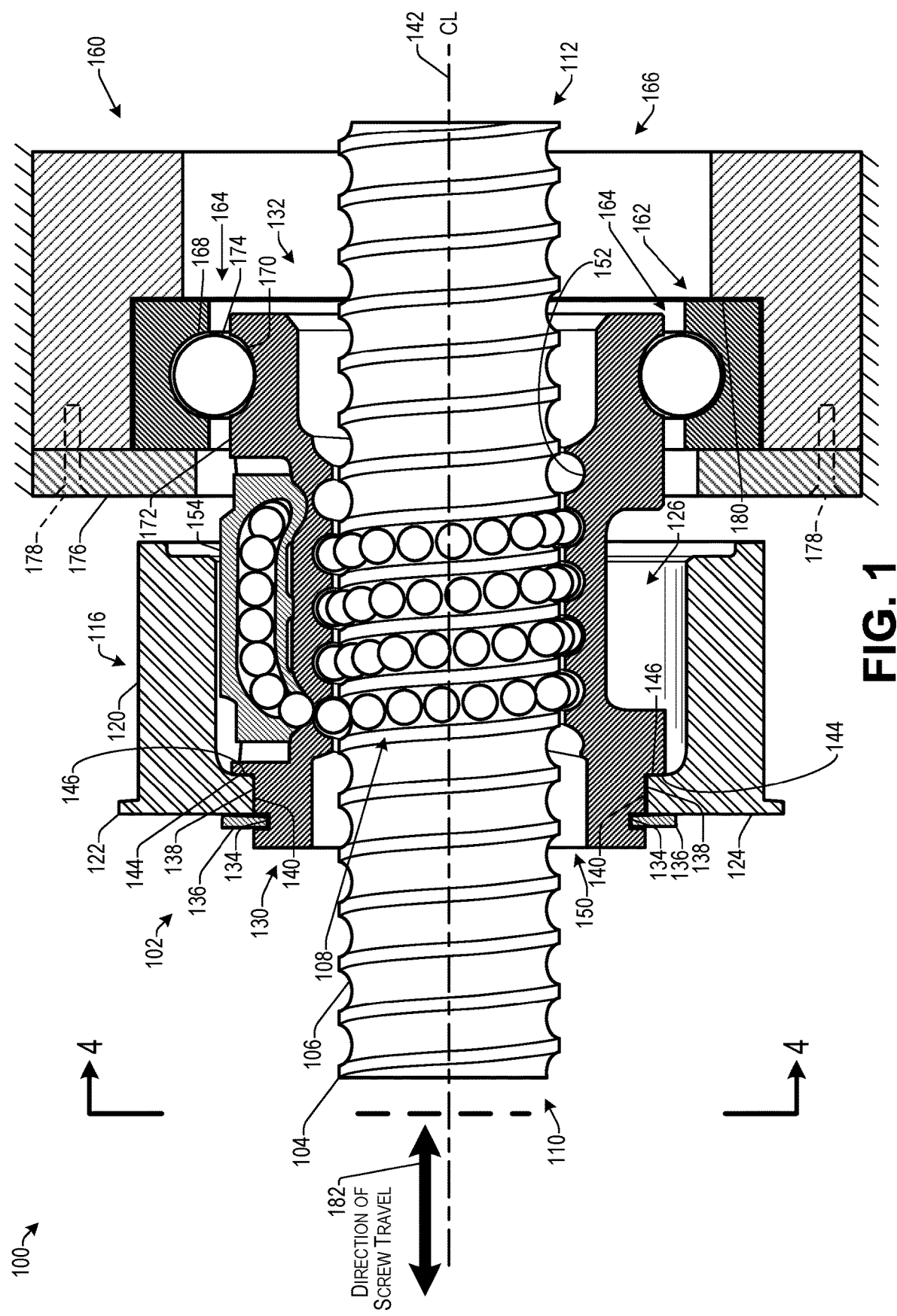
FIG. 1 illustrates a cross-sectional view of a ball screw assembly including a pulley and ball nut assembly according to some implementations.

FIG. 1 illustrates a cross-sectional view of a ball screw assembly 100 including a pulley and ball nut assembly 102 according to some implementations. In the ball a screw assembly 100, the pulley and ball nut assembly 102 is mounted on a screw 104. The screw 104 includes an external helical groove 106 having a generally semicircular cross section to act as one-half of a bearing race for receiving a plurality of ball bearings 108.

The screw 100 illustrated in this example may be only a portion of the screw 100, and in some applications the screw 100 may be substantially longer so that at least one of a first end 110 or a second end 112 contacts, connects to, or otherwise engages with, one or more additional mechanisms (not shown in FIG. 1). As one non-limiting example, the screw 104 may connect to or otherwise engage with a rack of a rack-and-pinion steering system (not shown in FIG. 1) for a vehicle such as to provide power steering assistance to the rack-and-pinion steering; however, numerous other applications for the ball screw assembly 100 will be apparent to those of skill in the art having the benefit of the disclosure herein.

The pulley and ball nut assembly 102 includes a pulley 116 and a ball nut 118. As discussed additionally below, the pulley may have a generally cylindrical shape with an exterior cylindrical surface 120 for contacting with a belt, chain, or other power conveying mechanism (not shown in FIG. 1). In addition, the pulley 116 includes a peripheral flange 122 that is contiguous with an outer face 124 of the pulley 116. The pulley 116 further includes a cylindrical bore 126 for receiving a portion of the ball nut 118.

The ball nut 118 includes a first end 130 for receiving the pulley 116, and a second end 132 for mounting the ball nut 118. The first end 130 is generally cylindrical and includes a circumferential retaining ring groove 134 formed around a periphery of the first end 130 for receiving a retaining ring 136. In the illustrated example, retaining ring 136 includes a bevel feature that functions to press the retaining ring 136 against the pulley 116, creating a wedge fit between the pulley 116, the ball nut 118, and the retaining ring 136 (i.e., by pressing against the inside of the groove 134 on the inner circumference of the retaining ring, and pressing against the outer face 124 of the pulley 118 on the outer circumference of the retaining ring 136. This feature helps avoid loosening of the press fit and takes up any endplay should the press fit come loose, thereby reducing possible vibrations.

The first end 130 further includes an outer cylindrical surface 138 that is sized to fit with an inner cylindrical surface 140 on the pulley 116 as a press fit (also referred to as an interference fit) so that the pulley 116 automatically centers on a center of rotation of the ball nut 118 around a center line 142 when the pulley 116 is mounted on the first end 130 of the ball nut 118. In addition, the first end 130 of the ball nut 118 includes a generally circumferential shoulder 144 that abuts an inner face 146 of the pulley 116 when the pulley 116 is press fitted onto the first end 130 of the ball nut 118. For instance, the shoulder 144 may limit how far the pulley 116 is press fitted onto the ball nut 118, to ensure that the ball nut is positioned beyond the peripheral retaining ring groove 134 to enable installation of the retaining ring 136, but no further. Accordingly, at least a portion of the ball nut 118 forming the shoulder 144 may have a larger diameter than a diameter of the outer cylindrical surface 138.

The inner face 146 on the pulley 116 extends radially outward away from the inner cylindrical surface 140 within the cylindrical bore 126 of the pulley 116 a sufficient distance so that the inner face 146 abuts the shoulder 144 of the ball nut 118 when the pulley 116 has been press fitted onto the first end 130 of the ball nut 118. Furthermore, the outer face 124 of the pulley 116 extends radially outwardly from the inner cylindrical surface 140 of the pulley 116 on a side of the inner cylindrical surface 140 opposite to the inner face 146.

The ball nut 118 includes a hollow bore 150 that is open on both the first end 130 and the second end 132 to enable the screw 104 to pass through the hollow bore 150. The hollow bore 150 includes an internal helical groove 152 that is generally semicircular in cross-section and that is complementary to the external helical groove 106 formed in the screw 104. For example, the internal helical groove 152 located within the hollow bore 150 of the ball nut 118 may be configured to align with the external helical groove 106 on the screw 104 for containing the plurality of ball bearings 108. As illustrated, the plurality of ball bearings 108 may roll within the spaces formed between the external helical groove 106 and the internal helical groove 152. In some cases, as is known in the art, one or more brushes, wipers, or the like (not shown in FIG. 1 for clarity of illustration), may be located at each end of the internal helical groove 152 to cause the ball bearings to recirculate through a ball return tube 154 mounted on the exterior of the ball nut 118.

The second end 132 of the ball nut 118 may be configured for mounting the ball nut 132 to a fixed structure 160. In the illustrated example, the fixed structure 160 includes a cylindrical cavity 162 for receiving a mounting bearing 164 and having an opening 166 to enable passage of the screw 104. The mounting bearing 164 includes an outer ball bearing race 168, and the ball nut 118 includes a complimentary inner bearing race 170 formed on a generally cylindrical exterior wall 172 of the ball nut 118. A plurality of ball bearings 174 are located within the ball bearing races 168 and 170. The bearing race 170 is formed in the cylindrical exterior wall 172 around a circumference of the cylindrical exterior wall 172 to enable the mounting bearing 164 to be disposed on the inner bearing race 170 to support the ball nut 118 and enable rotation of the ball nut 118.

A variety of techniques may be used for retaining the mounting bearing 164 in the fixed structure 160. In the illustrated example, a plate 176 is fastened to the fixed structure 160 by a plurality of fasteners 178, such as machine screws, for sandwiching the mounting bearing between the plate 176 and a wall 180 of the fixed structure 160.

The mounting bearing 164 prevents lateral movement of the ball nut 118 along the centerline 142, while allowing rotational movement of the ball nut 118 around the centerline 142, which is also the axis of rotation of the ball nut 118. Accordingly, when the ball nut 118 rotates, such as due to a rotational force applied to the pulley 116, the rotational force causes the ball bearings 108 to apply a lateral force to the screw 104, causing the screw 104 to move in a lateral linear direction of screw travel along the centerline 142, as indicated by the arrow at 182. As discussed additionally below, one or more tabs (not shown in FIG. 1) in the pulley 116 interlock with one or more respective slots not shown in FIG. 1) in the first end 130 of the ball nut 118 to prevent relative rotation between the pulley 116 and the ball nut 118.

Figure 2:
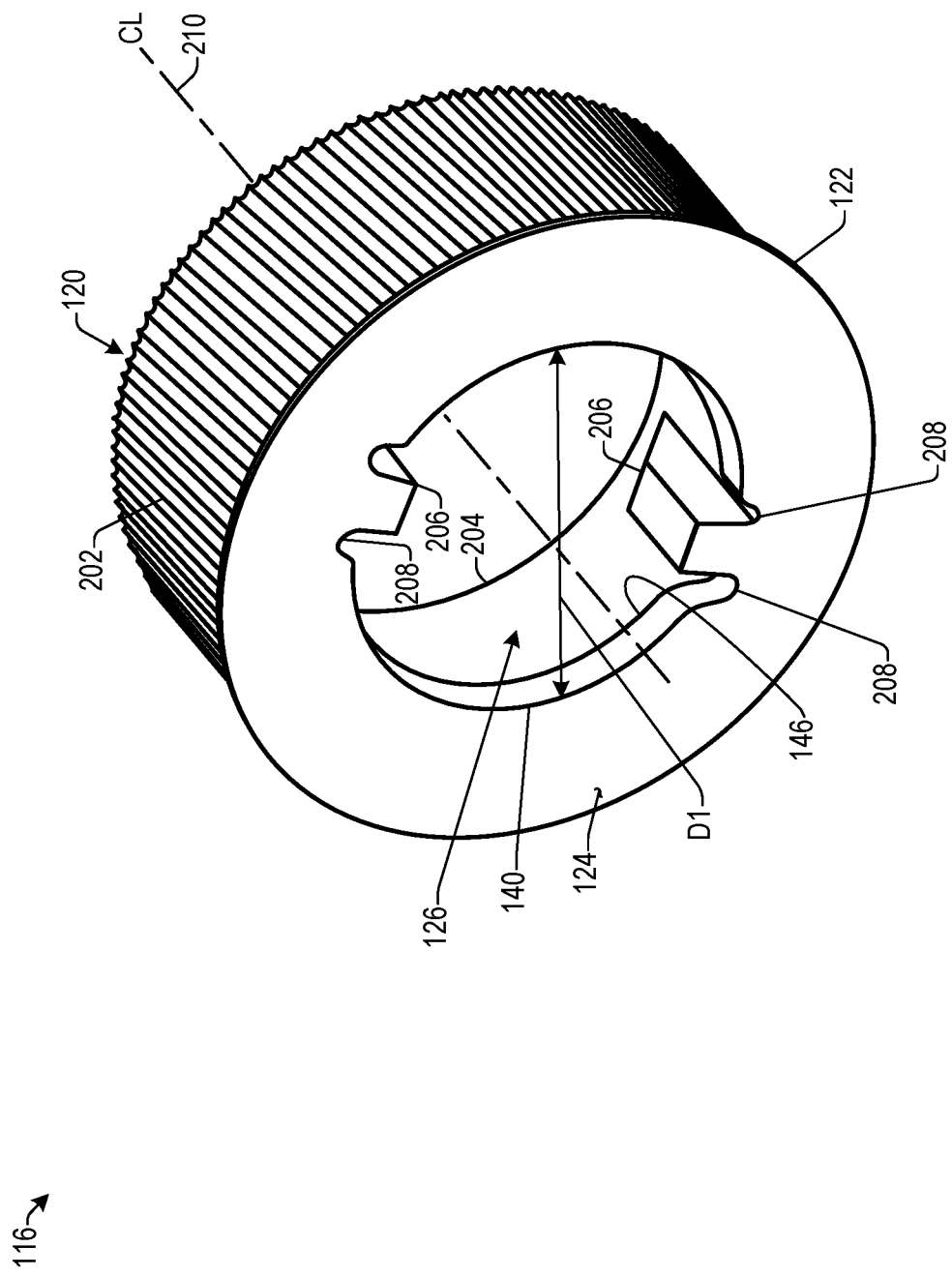
FIG. 2 illustrates a perspective view of the example pulley according to some implementations.

FIG. 2 illustrates a perspective view of the example pulley 116 according to some implementations. As mentioned above, the pulley 116 includes the exterior cylindrical surface 120 for contacting with a belt, chain, or other power conveying mechanism. In this example, the exterior cylindrical surface 120 includes a plurality of lateral grooves 202. The lateral grooves 202 may be angled with respect to an axis of rotation of the pulley 116 to cause a belt acting on the pulley 116 to tend to move toward the flange 122 that is contiguous with the outer face 124 of the pulley 116, thus obviating the need for an additional flange on an opposite side 204 of the pulley 116.

In addition, the pulley includes one or more tabs 206 extending inward toward the center of the pulley from the cylindrical surface, and further extending in an axial direction into the cylindrical bore 126 of the pulley 116. In this example, two tabs 206 are illustrated, diametrically opposed to each other and positioned to engage with respective slots; however, in other examples, one tab 206 may be used or more than two tabs 206 may be used, depending on an amount of torque expected to be transferred and the type of material from which the pulley 116 and the ball nut 118 are constructed. As discussed above, and as discussed additionally below, the one or more tabs 206 may engage with one or more slots, respectively, in the ball nut 118 to prevent relative rotation between the pulley 116 and the ball nut 118. The one or more tabs may include a fillet 208 on each side of each the tabs 206 to enable closer fit between the tab and the corresponding slot on the ball nut 118. In some examples, as illustrated, the fillet 208 may extend into the inner cylindrical surface 140 and may be semicircular in shape when viewed in the axial direction.

In addition, as mentioned above, the inner cylindrical surface 140 includes a diameter D1 that may be closely controlled to be centered on the centerline 210 of the pulley corresponding to the intended axis of rotation. In addition, the size of the diameter D1 may be controlled with respect to a diameter of the outer cylindrical surface 138 (discussed above with respect to FIG. 1) of the ball nut 118 to provide a press fit when the pulley 116 is mounted onto the ball nut 118. Accordingly, the cylindrical inner surface 140 is controlled to enable the pulley to be self-centering on the ball nut 118 within a close tolerance, and therefore, during assembly, the pulley is centered around the axis of rotation of the ball nut 118, which removes a centering step during assembly, and which avoids the possibility of binding, uneven wear of the bearings, or other undesirable forces from being applied to the ball nut 118, the screw 104, and/or the ball bearings within the ball nut 118 during operation.

The pulley 116 may be constructed of any suitable material that can handle the design loads of the system in which the pulley will be used. As several examples, the pulley may be constructed of a phenolic material, a powdered metal or sintered material, or any of numerous other metals, polymers, or the like.

Figure 3:
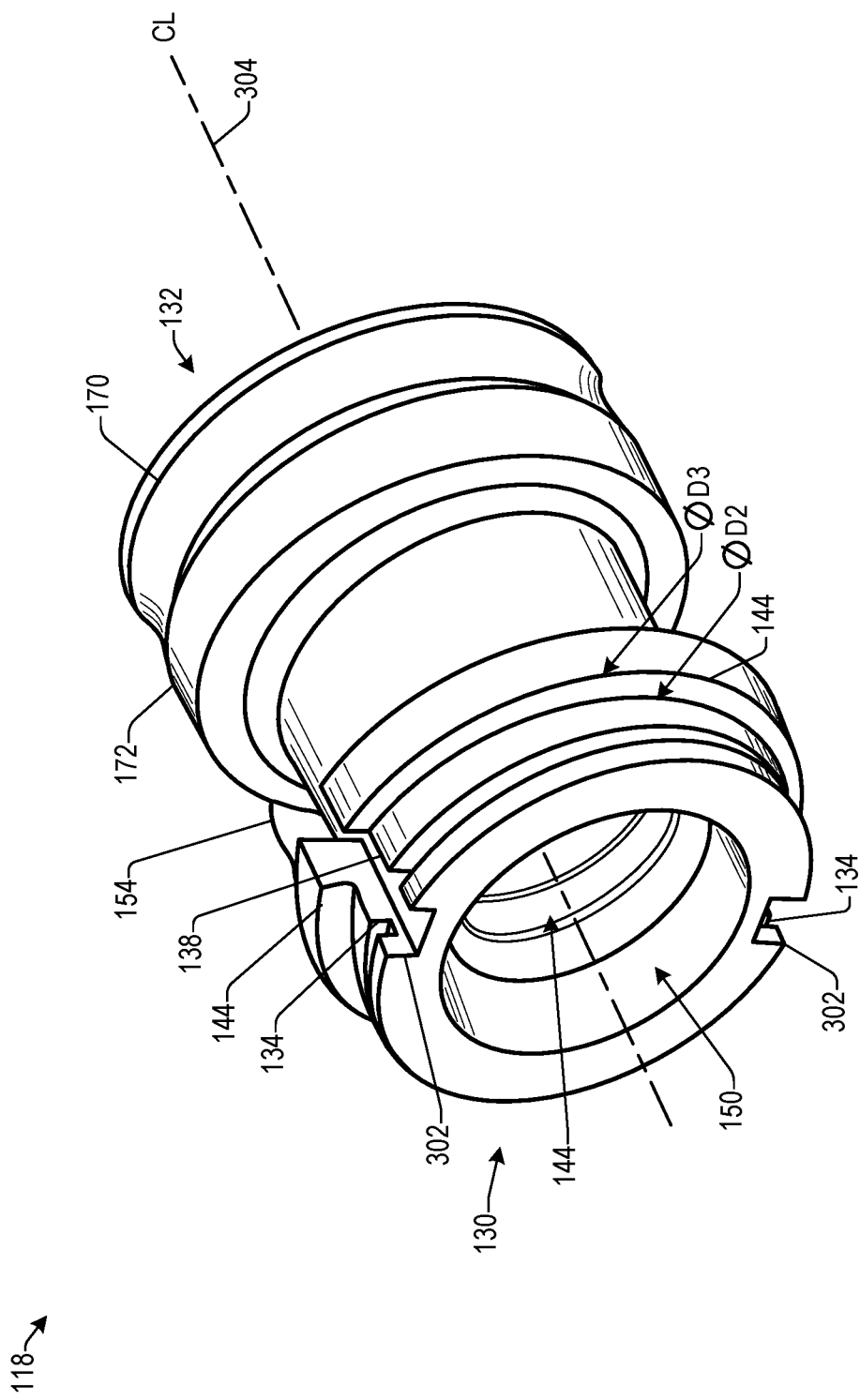
FIG. 3 illustrates a perspective view of the example ball nut according to some implementations.

FIG. 3 illustrates a perspective view of the example ball nut 118 according to some implementations. The example ball nut 118 illustrated in FIG. 3 is rotated 90 degrees counterclockwise with respect to the ball nut 118 illustrated in FIGS. 1 to provide a view of slots 302. As mentioned above, the ball nut 118 may include one or more slots 302 on the first end 110 for receiving the one or more tabs 206 extending inward on the pulley 116, as discussed above with respect to FIG. 2. In this example, the slots 302 extend through the shoulder 144 so that the material of the ball nut 118 making up the shoulder 144 also provides support against relative rotation between the ball nut 118 and the pulley 116. The slot 302 may have a shape that is complementary with respect to the tab 206 discussed above with respect to FIG. 2 to enable the tab 206 to engage with the slot when the pulley 116 is press fitted onto the first end 110 of the ball nut 118. In this example, two slots 302 are shown diametrically opposed to each other; however, in other examples, more or fewer slots and corresponding tabs may be used.

Furthermore, as discussed above, the ball nut 118 includes the outer cylindrical surface 138 which has a diameter D2 that is controlled to enable a press fit with the diameter D1 of the inner cylindrical surface 140 of the pulley 116, as discussed above, e.g., with respect to FIGS. 1 and 2. Thus, the diameter D2 of the outer cylindrical surface 138 may be slightly larger than the diameter D1 of the inner cylindrical surface of the pulley to engage in a press fit, so that the press fit centers the pulley on the ball nut with respect to the axis of rotation about the centerline 304. The specific difference in diameters between the diameter D1 and the diameter D2 may depend at least partially on the materials used for constructing the ball nut 118 and the pulley 116, as well as the desired tightness of the press fit, as will be apparent to those of skill in the art having the benefit of the disclosure herein. The materials used to construct the ball nut 118 may be any of the materials discussed above for constructing the pulley or any of various other suitable materials known to those of skill in the art.

Further, the shoulder 144 adjacent to the outer cylindrical surface 138 has a diameter D3 that is larger than the diameter D2 of the outer cylindrical surface 138 to enable the shoulder 144 to stop advancement of the pulley during the press fit operation and abut against an inner face 146 of the pulley 116 (not shown in FIG. 3), as discussed above with respect to FIG. 1. In addition, the ball nut 118 illustrated in FIG. 3 shows the bearing race 170 formed in the cylindrical exterior wall 172. As discussed above with respect to FIG. 1, the bearing race 170 may be used to rotatably mount the ball nut 118 to mounting bearing 164 and the fixed structure 160.

Figure 4:
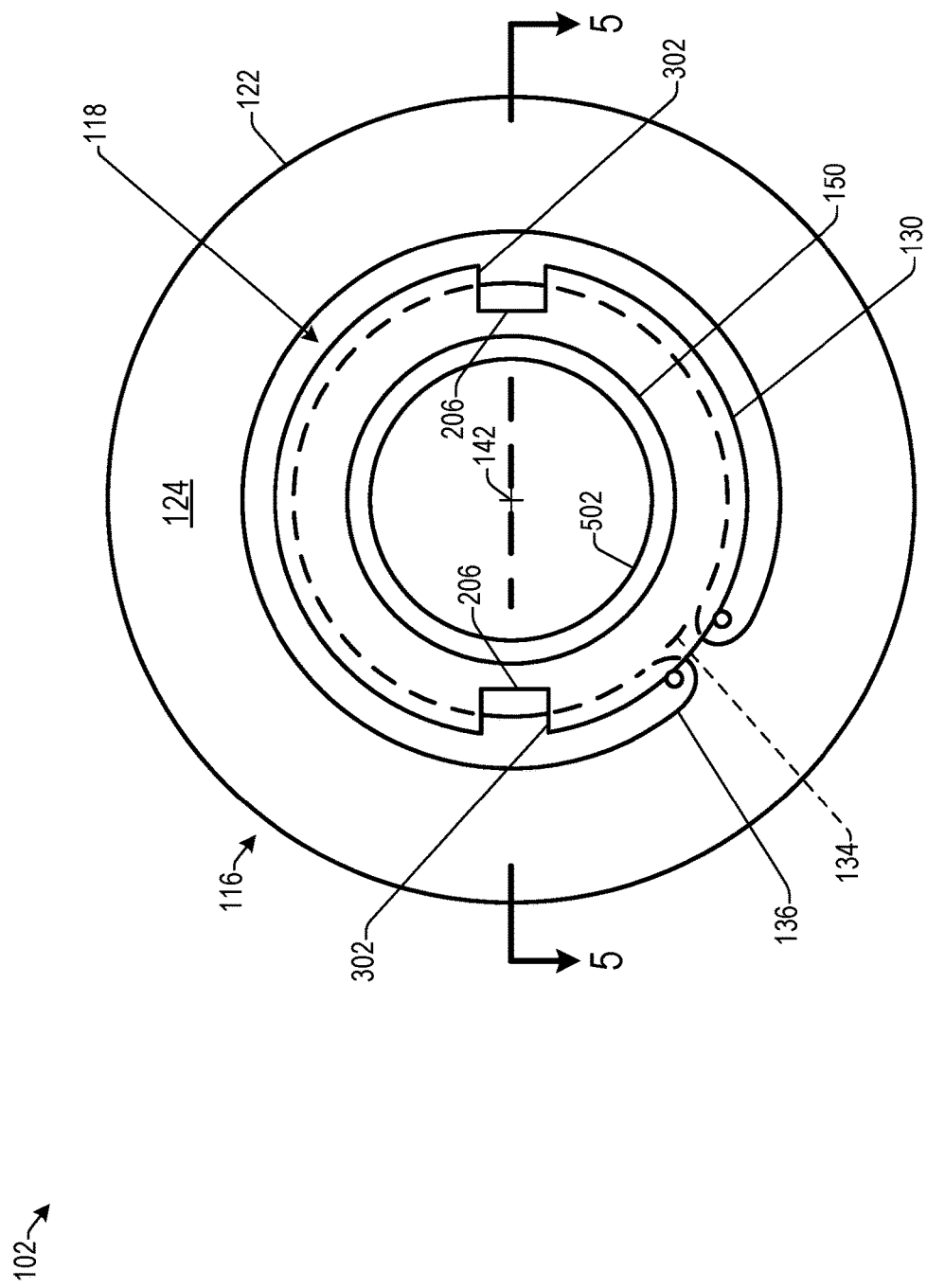
FIG. 4 illustrates a side view of the pulley and ball nut assembly as viewed along line 4-4 of FIG. 1 according to some implementations.

FIG. 4 illustrates a side view of the pulley and ball nut assembly 102 as viewed along line 4-4 of FIG. 1 according to some implementations. In this example, the screw 104 is not shown for clarity of illustration. In this example, the outer face 124 of the pulley is visible, with the first end 130 of the ball nut 118 extending through the opening in the outer face 124 corresponding to the inner cylindrical surface 140 (not shown in FIG. 4). The retaining ring 136 is installed in the groove 134 to prevent the pulley 116 from being removed from the first end 130 of the ball nut 118. In this example, only the hidden lines for the retaining ring 136 and the groove 134 are shown for clarity of illustration.

In addition, in this example, the tabs 206 of the pulley 116 extending inward toward the centerline 142 are shown inserted into the slots 302 of the ball nut first and 130. Also visible in this view is shoulder material 502 of the interior helical groove within the bore 150 of the ball nut 118.

Figure 5:
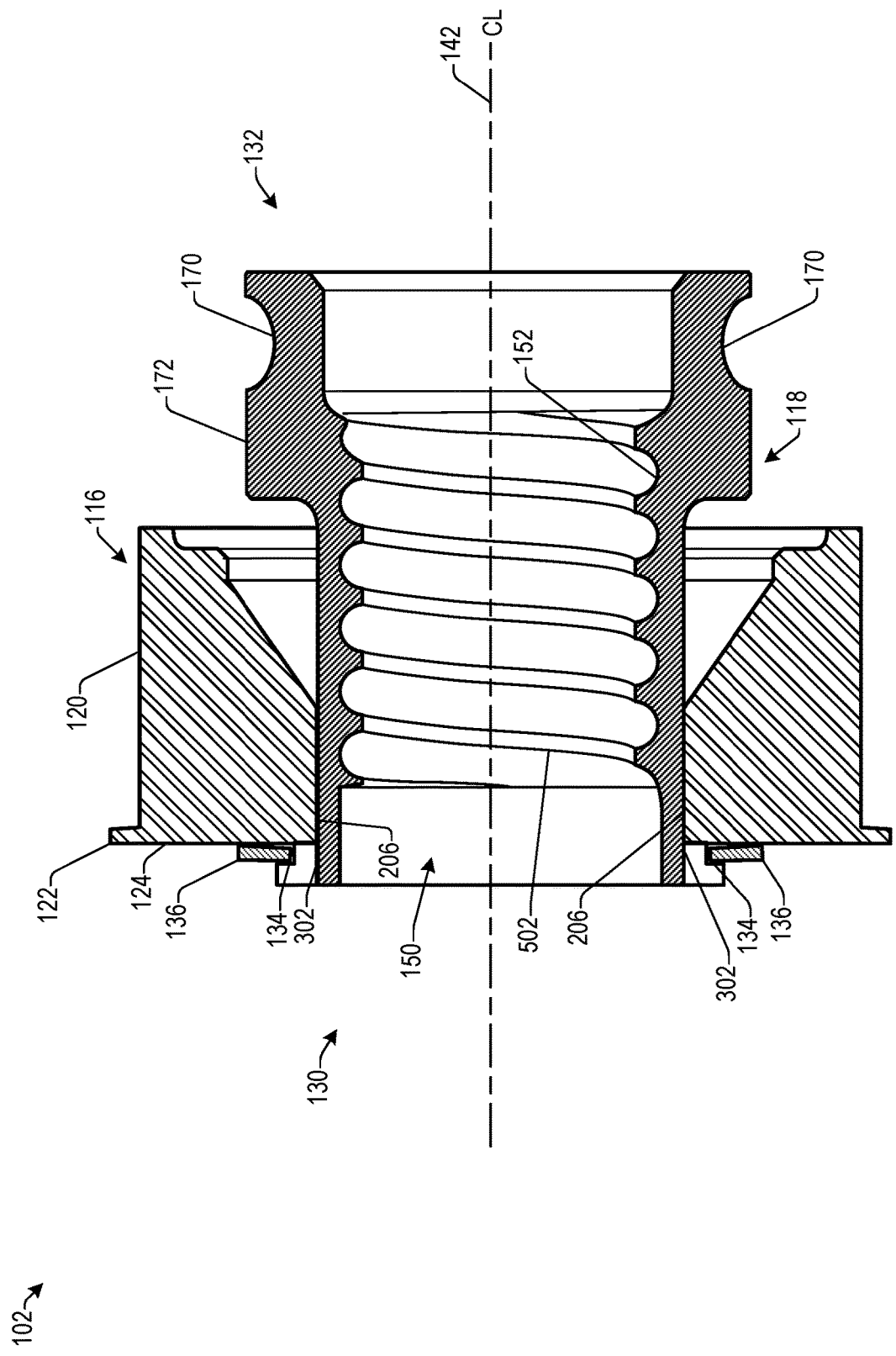
FIG. 5 illustrates a cross sectional view of the pulley and ball nut assembly as viewed along line 5-5 of FIG. 4 according to some implementations.

FIG. 5 illustrates a cross sectional view of the pulley and ball nut assembly 102 as viewed along line 5-5 of FIG. 4 according to some implementations. The cross-sectional view of FIG. 5 shows the ball nut 118 and pulley 116 rotated 90 degrees about the centerline 142 relative to the view of FIG. 1. In this example, the tabs 206 are inserted into the slots 302 and the pulley 116 has been press fitted onto the ball nut 118. In addition, in this view, it may be seen that the retaining ring 136 is inserted into the retaining ring slot 134, and is beveled to provide a spring force against the outer face 124 of the pulley 116. For example, due to the bevel, a portion (e.g., the interior circumference) of the retaining ring 136 presses against the interior of the circumferential groove and another portion (e.g., the exterior circumference) of the retaining ring 136 presses against the outer face 124 of the pulley 116.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A ball screw assembly comprising:
   a ball nut including a first end having a cylindrical shape with a slot formed in an axial direction corresponding to an axis of rotation of the ball nut, the ball nut further including an outer cylindrical surface having a first diameter;
   a pulley mounted on the first end of the ball nut, the pulley including a tab extending inward from an inner cylindrical surface of the pulley, the tab further extending in the axial direction and having a shape complimentary to a shape of the slot for insertion into the slot, wherein the inner cylindrical surface has a second diameter larger than the first diameter, and sized to engage with the outer cylindrical surface in a press fit, wherein the press fit centers the pulley on the ball nut and causes an inner face of the pulley to abut a shoulder extending outward from the outer cylindrical surface of the ball nut, the pulley including an outer face on a side opposite to the inner face, the outer face extending radially outward from the inner cylindrical surface perpendicularly to the axis of rotation;

a circumferential groove formed in a portion of the first end of the ball nut that extends beyond the pulley, extending opposite to a direction in which the pulley is press fitted onto the outer cylindrical surface, the groove disposed at a location beyond a furthest extent of the pulley, and beyond the outer face of the pulley after the pulley has been press fitted onto the first end of the ball nut, the circumferential groove extending radially inward into the outer cylindrical surface of the ball nut;

a retaining ring disposed in the circumferential groove to contact the outer face and the groove to prevent removal of the pulley from the first end of the ball nut; and a screw passing through a hollow bore of the ball nut, the screw including an external helical groove configured to align with an internal helical groove located within the hollow bore for receiving a plurality of ball bearings, wherein rotation of the pulley and the ball nut causes the ball bearings to apply a lateral force to the screw to move the screw in the axial direction.

2. The ball screw assembly as recited in claim 1, comprising wherein:
at least a portion of the shoulder on the ball nut extending outward from the outer cylindrical surface has a third diameter larger than the first diameter; and
the inner face of the pulley extends radially away from the inner cylindrical surface within a cylindrical bore of the pulley.

3. The ball screw assembly as recited in claim 1, wherein:
the ball nut includes two of the slots, diametrically opposed to each other; and
the pulley includes two of the tabs diametrically opposed to each other and positioned to engage with the slots, respectively, when the pulley is press fitted onto the first end of the ball nut.

4. The ball screw assembly as recited in claim 1, further comprising:
a cylindrical exterior wall on the ball nut, with a bearing race formed in the cylindrical exterior wall around a circumference of the cylindrical exterior wall; and
a mounting bearing disposed on the bearing race to support the ball nut and enable rotation of the ball nut.

5. The ball screw assembly as recited in claim 4, wherein the mounting bearing is mounted in a fixed structure to prevent lateral movement of the ball nut in the axial direction, while allowing rotational movement of the ball nut around the axis of rotation.

6. The ball screw assembly as recited in claim 1, wherein the retaining ring is beveled to provide a spring force so that a portion of the retaining ring presses against the circumferential groove and another portion of the retaining ring presses against the outer face of the pulley.

7. The ball screw assembly as recited in claim 1, further comprising a fillet adjacent to the tab, the fillet extending below the inner cylindrical surface and having a semicircular shape when viewed in the axial direction.

8. An apparatus comprising:
a ball nut including a first end having a cylindrical shape with a slot formed in an axial direction corresponding to an axis of rotation of the ball nut, the ball nut further including an outer cylindrical surface having a first diameter;
a pulley mounted on the first end of the ball nut, the pulley including a tab extending inward from an inner cylindrical surface of the pulley, the tab further extending in the axial direction for insertion into the slot, wherein the inner cylindrical surface has a second diameter larger than the first diameter and sized to engage with the outer cylindrical surface in a press fit, wherein the press fit causes an inner face of the pulley to abut a shoulder extending outward from the outer cylindrical surface of the ball nut, the pulley including an outer face on a side opposite to the inner face, the outer face extending radially outward from the inner cylindrical surface perpendicularly to the axis of rotation;
a circumferential groove formed in a portion of the first end extending beyond the pulley, extending opposite to a direction in which the pulley is press fitted onto the outer cylindrical surface, the groove disposed at a location beyond a furthest extent of the pulley, and beyond the outer face of the pulley after the pulley is mounted on the first end of the ball nut; and
a retaining ring disposed in the circumferential groove to prevent removal of the pulley from the first end of the ball nut.

9. The apparatus as recited in claim 8, wherein:
at least a portion of the shoulder on the ball nut extending outward from the outer cylindrical surface has a third diameter larger than the first diameter; and
the inner face of the pulley extends radially away from the inner cylindrical surface within a cylindrical bore of the pulley.

10. The apparatus as recited in claim 8, further comprising:
a screw passing through a hollow bore of the ball nut, the screw including an external helical groove configured to align with an internal helical groove located within the hollow bore of the ball nut for receiving a plurality of ball bearings,
wherein rotation of the pulley and the ball nut causes the ball bearings to apply a lateral force to the screw to move the screw in the axial direction.

11. The apparatus as recited in claim 8, wherein:
the ball nut includes two of the slots, diametrically opposed to each other; and
the pulley includes two of the tabs diametrically opposed to each other and positioned to engage with the slots, respectively, when the pulley is press fitted onto the first end of the ball nut.

12. The apparatus as recited in claim 8, further comprising a fillet adjacent to the tab, the fillet extending below the inner cylindrical surface and having a semicircular shape when viewed in the axial direction.

13. The apparatus as recited in claim 8, further comprising:
a cylindrical exterior wall on the ball nut, with a bearing race formed in the cylindrical exterior wall around a circumference of the cylindrical exterior wall; and a mounting bearing disposed on the bearing race to support the ball nut and enable rotation of the ball nut.

14. The apparatus as recited in claim 13, wherein the mounting bearing is mounted in a fixed structure to prevent lateral movement of the ball screw in the axial direction, while allowing rotational movement of the ball screw around the axis of rotation.

15. The apparatus as recited in claim 8, wherein the retaining ring is beveled to provide a spring force so that a portion of the retaining ring presses against the circumferential groove and another portion of the retaining ring presses against the pulley.

16. A pulley and ball nut assembly comprising:
a ball nut including a first end, the ball nut further including an outer cylindrical surface having a first diameter;
a pulley mounted on the first end of the ball nut, the pulley having an inner cylindrical surface having a second diameter larger than the first diameter and sized to engage with the outer cylindrical surface in a press fit, wherein the press fit causes an inner face of the pulley to abut a shoulder extending outward from the outer cylindrical surface of the ball nut, the pulley including an outer face on a side opposite to the inner face, the outer face extending radially outward from the inner cylindrical surface perpendicularly to the axis of rotation;
a circumferential groove formed in a portion of the first end extending beyond the pulley, extending opposite to a direction in which the pulley is press fitted onto the outer cylindrical surface, the groove disposed at a location beyond a furthest extent of the pulley, and beyond the outer face of the pulley after the pulley is mounted on the first end of the ball nut; and
a retaining ring disposed in the circumferential groove to prevent removal of the pulley from the first end of the ball nut, wherein a portion of the ball nut engages with a portion the pulley to prevent relative rotation between the pulley and the ball nut.

17. The pulley and ball nut assembly as recited in claim 16, wherein:
the portion of the ball nut includes a slot formed in an axial direction corresponding to an axis of rotation of the ball nut; and
the portion of the pulley includes a tab extending inward from the inner cylindrical surface of the pulley, the tab further extending in the axial direction and having a shape complimentary to a shape of the slot for engaging with the slot when the pulley is press fitted on the ball nut.

18. The pulley and ball nut assembly as recited in claim 16, wherein:
at least a portion of the shoulder on the ball nut extending outward from the outer cylindrical surface has a third diameter larger than the first diameter; and
the inner face on the pulley extends radially away from the inner cylindrical surface within a cylindrical bore of the pulley.

19. The pulley and ball nut assembly as recited in claim 16, further comprising:
a cylindrical exterior wall on the ball nut, with a bearing race formed in the cylindrical exterior wall around a circumference of the cylindrical exterior wall to enable a mounting bearing to be disposed on the bearing race to support the ball nut and enable rotation of the ball nut.

20. The pulley and ball nut assembly as recited in claim 16, further comprising:
an internal helical groove located within a hollow bore of the ball nut, the internal helical groove configured to align with an external helical groove on a screw for receiving a plurality of ball bearings.

* * * * *